US010166983B2

(12) United States Patent
Liu et al.

(10) Patent No.: US 10,166,983 B2
(45) Date of Patent: Jan. 1, 2019

(54) PEDAL CRUISE CONTROL (PCC)

(71) Applicant: Continental Automotive GmbH, Hannover (DE)

(72) Inventors: Songshan Liu, Nanxiang (CN); Jian Su, Minhang District / Shanghai (CN)

(73) Assignee: Continental Automotive GmbH, Hannover (DE)

(*) Notice: Subject to any disclaimer, the term of this patent is extended or adjusted under 35 U.S.C. 154(b) by 67 days.

(21) Appl. No.: 15/360,435

(22) Filed: Nov. 23, 2016

(65) Prior Publication Data

US 2017/0151948 A1    Jun. 1, 2017

(30) Foreign Application Priority Data

Nov. 26, 2015  (CN) .......................... 2015 1 0833986

(51) Int. Cl.
| | | |
|---|---|---|
| *B60W 50/12* | (2012.01) | |
| *B60W 30/12* | (2006.01) | |
| *B60W 30/14* | (2006.01) | |
| *B60W 40/105* | (2012.01) | |
| *B60W 50/14* | (2012.01) | |

(Continued)

(52) U.S. Cl.
CPC ........ *B60W 30/143* (2013.01); *B60W 40/105* (2013.01); *B60W 50/0098* (2013.01); *B60W 50/082* (2013.01); *B60W 50/14* (2013.01); *B60W 2050/0089* (2013.01); *B60W 2510/0609* (2013.01); *B60W 2520/10* (2013.01); *B60W 2540/10* (2013.01); *B60W 2540/106* (2013.01)

(58) Field of Classification Search
CPC .......... B60W 40/105; B60W 50/0098; B60W 50/082; B60W 50/14

USPC ......................................... 701/97
See application file for complete search history.

(56) References Cited

U.S. PATENT DOCUMENTS

2013/0261889 A1*  10/2013  Sekine .............. B60W 30/143
                                                        701/36
2015/0203126 A1*  7/2015  Kobana .............. B60W 50/12
                                                       701/93

FOREIGN PATENT DOCUMENTS

| CN | 102114839 A | 7/2011 |
|---|---|---|
| CN | 103010213 A | 4/2013 |
| CN | 103350699 A | 10/2013 |

(Continued)

OTHER PUBLICATIONS

Chinese Office Action and Search Report in Chinese Patent Application No. 201510833986.5, dated Jul. 4, 2018, 6 pages.

*Primary Examiner* — Maceeh Anwari
(74) *Attorney, Agent, or Firm* — W. F. Fasse (57) ABSTRACT

A method of cruise control for a vehicle includes: checking for cruise conditions, determining whether the vehicle is in cruisecontrol mode, and if so, controlling the cruising speed of the vehicle until an exit signal is detected; checking the throttle deviation, to determine throttle stability; checking cruising speed, whereby if conditions for throttle stability are met, the speed deviation of the vehicle is calculated, and the cruising speed is set; if conditions for cruising have been met, issuing a cruising prompt message to the driver, and detecting actions of the driver, and if it is thereafter detected that the driver has released the throttle pedal, then entering the vehicle into cruise control mode whereby the vehicle speed is automatically controlled to the set cruising speed. A system is provided to perform the method. A cruise control which is low-cost, requires no control buttons, and offers a simple product structure is achieved.

16 Claims, 5 Drawing Sheets

(51) Int. Cl.
*B60W 50/00* (2006.01)
*B60W 50/08* (2012.01)

(56) References Cited

FOREIGN PATENT DOCUMENTS

JP 60-138246 A 7/1985
JP 2000-142168 A 5/2000

* cited by examiner

PEDAL CRUISE CONTROL (PCC)

PRIORITY CLAIM

This application is based on and claims the 35 USC 119 foreign priority of Chinese Patent Application CN 201510833986.5 filed on 26 Nov. 2015, the entire disclosure of which is incorporated herein by reference.

FIELD OF THE INVENTION

The present invention relates to a vehicle operating control technology, and more specifically to a system and method for automated cruise control.

BACKGROUND INFORMATION

Adaptive cruise control (ACC) and one-click cruise control (CC) functions currently on the market are commonly used in vehicles, wherein ACC functions requires a great many sensors, radar and imaging devices to detect the driving environment and the conditions around the vehicle body, with the need for determining the cruising speed being decided based on such detection results. One-click cruise control functions, on the other hand, require manual operation by drivers to enter cruise control.

It is obvious that ACC is a semi-automatic driving mode; however, the high cost and complexity make it difficult for ACC, as an automatic cruise control mode, to be widely used in all models of vehicles, in particular low-cost, low-end models.

With one-click cruise control, a button manually controlled by the driver acts as the controller for input reference, and thus in this technical solution, several buttons must be specially provided on the steering wheel, which leads to extra costs; furthermore, the operation with this technical solution may prove difficult to less experienced drivers, which results in the function being used less frequently.

In summary, the market reach of the two methods of cruise control in the prior art is greatly limited by the two restrictive factors of cost and complexity of hardware.

SUMMARY OF THE INVENTION

The primary aim of at least one embodiment of the present invention is to overcome the existing problems in the prior art by providing a method and system for cruise control which are low-cost, require no control buttons, and offer a simple product structure.

Based on one aspect of the present invention, a method for cruise control is provided which comprises the following steps: Checking for cruise conditions, determining whether the vehicle is in cruise control mode, and if the vehicle is in cruise control mode, maintaining and controlling the cruising speed until an exit signal is detected; Checking the throttle deviation, whereby if the vehicle is not in cruise control mode, said throttle deviation is checked to determine throttle stability; Checking the cruising speed, whereby the stability of the speed of the vehicle is determined and cruising speed is set; Checking the cruising prompt for drivers as well as drivers' actions, whereby when conditions for cruising have been met, a driver's cruising prompt message is set, and once it is detected that the driver has released the throttle pedal, the vehicle enters cruise control mode.

As an optional embodiment, said steps for checking cruise conditions include the following sub-steps:

Detecting signals relating to the operating conditions of the vehicle; said signals include the throttle pedal position signal, vehicle speed signal and exit signal;

Determining whether the vehicle is in cruise control mode;

If determined as being in cruise control mode, the vehicle will be controlled at the cruising speed, and kept at cruising speed as it is driven;

During the process of maintaining the cruising speed of the vehicle, it is determined as to whether there is an exit signal, and if an exit signal is detected, then the vehicle exits cruise control mode, and the determining of cruise conditions begins once again; if no exit signal is detected, then the current cruising state is maintained;

If determined that the vehicle is not in cruise control mode, it will be determined as to whether the count value of the cruise conditions counter is greater 0, and if so, the steps for checking the driver's actions proceeded to; while if not, the said process of checking throttle deviation will be proceeded to.

As an optional embodiment, said exit signal includes one or more from a brake signal, signal for degree of throttle depression, steering wheel signal, gear signal and clutch signal.

As an optional embodiment, said step for checking throttle deviation includes the following sub-steps:

Determining whether the throttle stability counter value is equal to 0, and if not, the process for counting of the throttle stability counter will be proceeded to;

If the throttle stability counter value is equal to 0, the absolute value of throttle deviation is calculated, with said throttle deviation absolute value being the absolute value given by the difference between two adjacent sample values of the degree of throttle depression;

Determining whether the absolute value of throttle deviation is less than the set throttle deviation threshold;

If the absolute value of throttle deviation is determined as being less than the set throttle deviation threshold, the degree of throttle depression is set to the reference value, while at the same time, the throttle stability counter is set to 0, and the process for counting the throttle stability counter will be proceeded to;

Determining whether the throttle stability counter value is greater than the set throttle stability threshold, whereby if the value of the throttle stability counter is greater than the set throttle stability threshold, the cruising speed checking process will be proceeded to.

As an optional embodiment, said step for counting of the throttle stability counter includes the following sub-steps:

Calculating the absolute value of throttle deviation, with said absolute value being given by the difference between the current degree of throttle depression and the throttle depression reference value;

Determining whether the obtained said absolute value of throttle deviation is less than the set throttle deviation threshold, and if so, a count of 1 is added to the throttle stability counter, with the calculation of the throttle deviation absolute value for the next cycle then being carried out, with this taking place until the throttle stability counter value is greater than the set throttle stability threshold, and the vehicle cruising speed then being checked;

If not, the throttle deviation checking is exited, and cruise conditions are checked once again.

As an optional embodiment, said process of checking cruising speed includes the following sub-steps:

Determining whether the vehicle speed stability counter value is equal to 0, and if not, the counting of the vehicle speed stability counter will be proceeded to;

If not, the absolute value of vehicle speed deviation is calculated, with said absolute value being the difference between two adjacent sample speeds;

Determining whether the absolute value of vehicle speed is less than the set vehicle speed deviation threshold;

If the absolute value of vehicle speed deviation is less than the set vehicle speed deviation threshold, the speed will be set to the reference value, while at the same time, the vehicle speed stability counter value is set to 0, and the process for counting the vehicle speed stability counter will be proceeded to; and Cruise conditions will be set.

As an optional embodiment, said process of counting of the vehicle speed stability counter includes the following sub-steps:

Calculating the absolute value of vehicle speed deviation, with said absolute value being given by the difference between the current vehicle speed and the vehicle speed reference value;

Determining whether said absolute value of speed deviation is less than the set vehicle speed deviation threshold, and if not, the vehicle speed stability counter is set to 0 and cruise control is exited, with checking of cruise conditions being carried out once again; while if so, a count of 1 is added to the vehicle speed stability counter value, with the vehicle speed deviation absolute value then calculated for the next cycle, with this taking place until the vehicle speed stability counter value is greater than the set vehicle speed stability threshold, and with the step for setting the cruise conditions being proceeded to.

As an optional embodiment, said process of setting cruise conditions includes the following sub-steps:

Setting cruising speed; and

Setting the cruise conditions counter to 0.

As an optional embodiment, said process of checking the prompt for drivers as well as the drivers' actions includes the following sub-steps:

Setting i.e. issuing the driver cruising prompt message or signal to be perceivable by the driver;

Checking whether the driver has released the throttle pedal, and if so, the vehicle entering cruise control mode;

If the driver fails to release the throttle pedal, a count of 1 is added to the cruise conditions counter, and the vehicle does not enter cruise control mode;

Determining whether the cruise conditions counter value is less than the set threshold for entering cruise mode, and if so, returning to the step for checking whether the driver has released the throttle pedal; if not, said step for checking cruise conditions is returned to.

As an optional embodiment, said driver cruising prompt message or signal includes a visible message displayed on a dashboard display and/or an audible voice message.

As an optional embodiment, during said step of throttle deviation checking, the deviation in the degree of throttle pedal depression between two control cycles within a certain period of time is less than the set throttle deviation threshold; meanwhile, during said step for checking cruising speed, the vehicle speed deviation is less than the set cruising speed deviation threshold, with a count of 1 being added to the vehicle speed stability counter, and if the count of said vehicle speed stability counter exceeds the set vehicle speed stability threshold, a request will be made to set the current vehicle speed as the cruising speed; during said step for checking the driver's actions, a cruise control prompt is given to the driver, and after the driver has received the cruise control prompt signal and released the throttle pedal, the cruising speed of the vehicle is maintained; when an exit signal is detected, cruise control is exited; this state is maintained until the above conditions are again met, whereupon cruise control mode is entered into once more.

Based on one aspect of the present invention, a cruise control system is provided, in which any of the aforementioned methods of cruise control are used in said cruise control system which comprises a signal acquisition and processing unit and a degree of throttle depression stability checking unit, vehicle speed stability checking unit, cruising speed setting unit, cruise control prompting unit and driver action checking unit, which are connected to said signal acquisition and processing unit.

In an optional technical embodiment of the present invention, by comparing both the degree of throttle pedal depression and the vehicle speed, a vehicle is able to enter cruise control without the driver being required to operate any buttons. The driver's intention to enter cruise mode can be identified via the degree of throttle pedal depression and vehicle speed, with the driver's intention with respect to cruise mode being ultimately determined by means of checking the driver's actions, with this simplifying the need for related hardware such as buttons and their corresponding circuits, thus providing a low-cost solution for vehicle cruise control.

BRIEF DESCRIPTION OF THE DRAWINGS

The drawings illustrated herein are used to provide further elaboration on the present invention and form an integral part of the present invention; while the illustrative embodiments and their descriptions are used to explain the present invention, they do not constitute any improper restriction to the present invention.

Drawings.

DETAILED DESCRIPTION OF EXAMPLE EMBODIMENTS OF THE INVENTION

The drawings will be referred to in conjunction with the embodiments hereafter in the detailed description of the present invention. It should be noted that, where there is no conflict, the features of the embodiments of the present invention may be combined with one another.

The state of cruise control is, in fact, a function for setting the speed a vehicle travels at in accordance with the driver, with existing cruise control products requiring the driver to operate a button on the steering wheel in order to travel at cruising speed. In effect, the driver's intentions are mainly determined via the direct input of the gear, clutch, brake, and throttle pedal. When the driver wishes to reduce speed, they must press down on the brake pedal, or release the throttle pedal. Similarly, for the driver to maintain their current speed, the throttle pedal can be kept in a certain position to achieve this goal. Therefore, the input from a button is not mandatory for cruise control.

In view of the problems and deficiencies in the prior art, the present invention achieves cruise control by reading information relating to the degree of throttle pedal deviation and vehicle speed deviation. The cruise control method of the present invention mainly involves the following: if the deviation in the degree of throttle pedal depression between two control cycles within a certain period of time is less than a certain set value—the throttle deviation threshold (throttle_deviation_threshold), while at the same time, the vehicle speed deviation is less than a certain set value—the cruising speed deviation threshold (speed_deviation_threshold), then a count of 1 is added to the vehicle speed stability counter (Velocity_Sta_Counter), and if the count of said vehicle speed stability counter exceeds a certain set value—the vehicle speed stability threshold (Velo_coun_threshold), a request will be made for the current vehicle speed or a certain set value to be set as the cruising speed, while said set value may be the average speed over a certain period of time, or an integer of speed having been rounded up or down, such as 50 km/h, 55 km/h, 60 km/h etc. When the driver receives a cruise control prompt signal and releases the throttle pedal, the vehicle will maintain the required speed after the throttle pedal has been released. When the driver brakes, or gives other exit signal, the vehicle exits cruise control. This state is maintained until the above conditions are met once again, with the vehicle entering into cruising mode once more.

The present invention compares both the degree of throttle pedal depression and the vehicle speed, so that a vehicle is able to enter cruise control without the driver being required to operate any buttons. The driver's intention to enter cruise mode can be identified via the degree of throttle pedal depression and vehicle speed, with the driver's intention with respect to cruise mode being confirmed by the release of throttle pedal, with this simplifying the need for hardware (such as buttons and their corresponding circuits), thus providing a low-cost solution for vehicle cruise control.

If the deviation in the degree of throttle pedal depression is less than a predetermined throttle pedal depression deviation threshold, such as 2%, the count of a timer or of a counter increases, and when the count exceeds a certain value, such as 500 control cycles (5 seconds), the vehicle speed conditions are checked, and if the vehicle speed deviation is less than a certain value, the count of the counter will increase. When the count of the counter exceeds a set threshold, a request to set the current vehicle speed as the cruising speed is made and sent to the vehicle controller, while at the same time, the corresponding prompt signal is shown on the dashboard display. After seeing the prompt signal, the driver releases the throttle pedal, and the vehicle enters cruise control mode.

The present invention controls speed and places the vehicle into cruise control mode by means of checking the deviation in the degree of throttle pedal depression, thereby solving the issue of button operation and the complicated product structure required to enter cruise control mode in the prior art, thereby simplifying the operational steps so that road safety is greatly improved.

Figure 1:
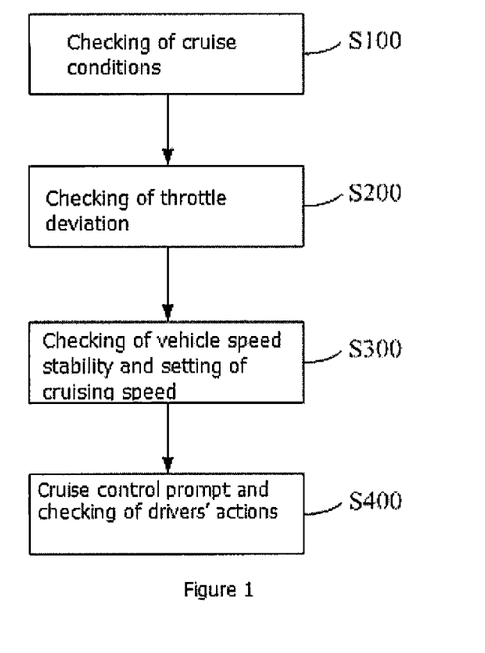
FIG. 1 is a work-flow diagram of a preferred embodiment of the cruise control method of the present invention.

A preferred embodiment of the present invention is described below in combination with the diagrams. With reference to FIG. 1, the method for cruise control in the present invention comprises the following steps:

Step S100: checking the cruising status, determining whether the vehicle is in cruise control mode;

Step S200: checking the throttle deviation, determining the throttle stability;

Step S300: checking stability of vehicle speed and setting cruising speed, whereby the stability of the speed of the vehicle is determined and cruising speed is set; and Step S400: checking the cruise control prompt for drivers as well as the drivers' actions, whereby when conditions for cruising have been met, a driver's cruising prompt message is set, and once it is detected that the driver has released the throttle pedal, the vehicle enters cruise control mode.

Figure 2:
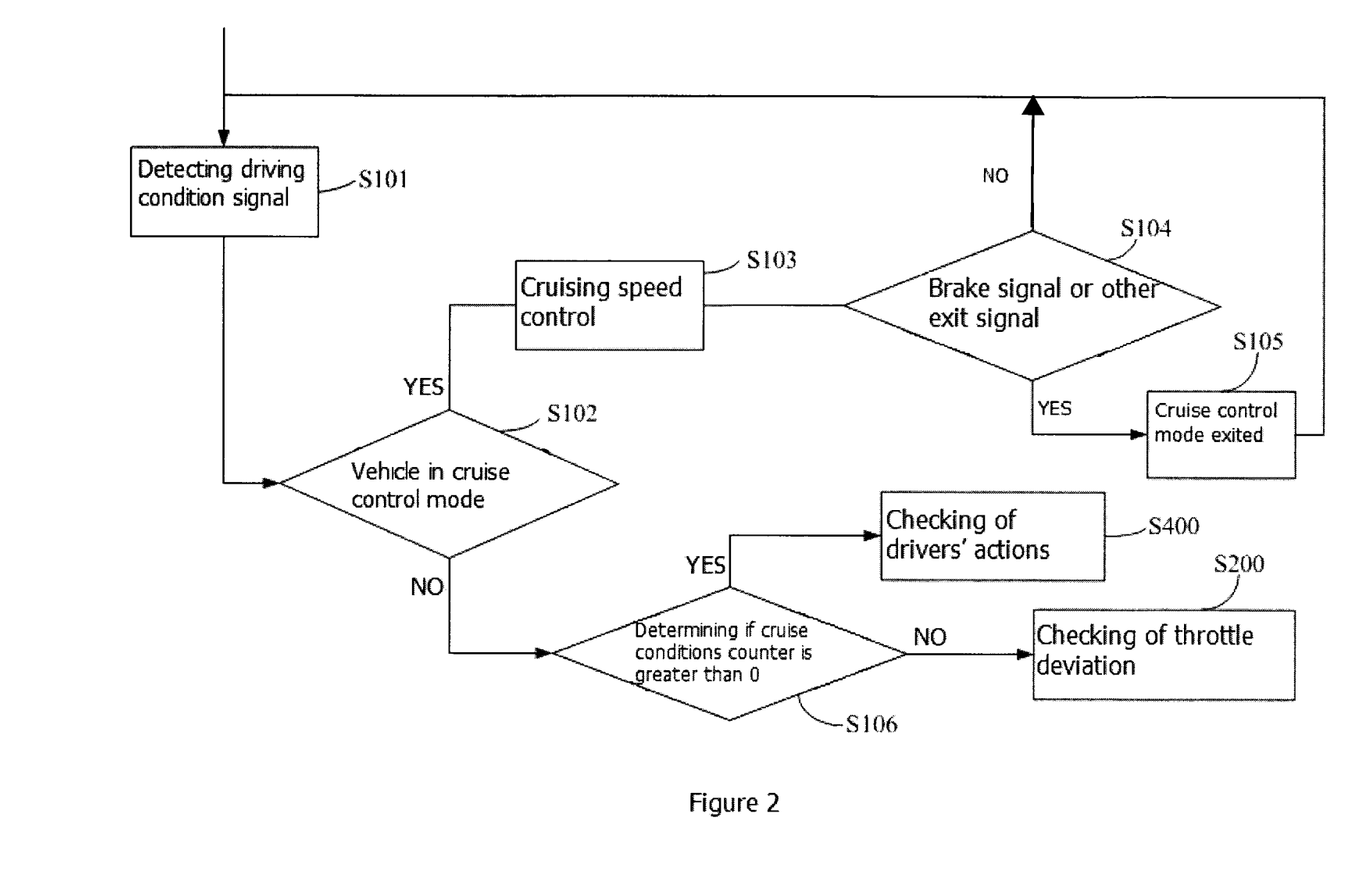
FIG. 2 is a work-flow diagram for the checking of cruise conditions as shown in FIG. 1.

Specifically, as shown in FIG. 2, said process for checking cruise conditions of the present invention, S100, comprises the following steps:

Step S101: detecting signals relating to the operating conditions of the vehicle, with said signals including degree of throttle depression (n), degree of throttle depression (n−1), vehicle speed (n), vehicle speed (n−1), a brake signal, steering wheel signal, gear signal, and clutch signal etc. Wherein degree of throttle depression (n) and degree of throttle depression (n−1) represent two adjacent samples for degree of throttle depression, providing the throttle pedal position signal; vehicle speed (n) and vehicle speed (n−1) represent two adjacent samples for speed, providing the speed signal, while the interval between the two sampling points is determined by the sampling cycle.

Step S102: determining whether the vehicle is in cruise control mode, and if so, proceeding to step S103; whereby if not, proceeding to step S106.

Step S103: if determined that the vehicle is in cruise control mode, it is controlled at the cruising speed, being kept at cruising speed as it is driven.

Step S104: determining whether or not a brake signal or other exit signal is present, with said exit signal mainly comprising of one or more from a brake signal, signal for degree of throttle depression, steering wheel signal, gear signal and clutch signal; whereby if a brake signal or other exit signal is detected, step S105 will be proceeded to, and if no brake signal or other exit signal is detected, step S101 will be returned to and cruise conditions are checked once again.

Step S105: exiting cruise control mode.

Figure 3:
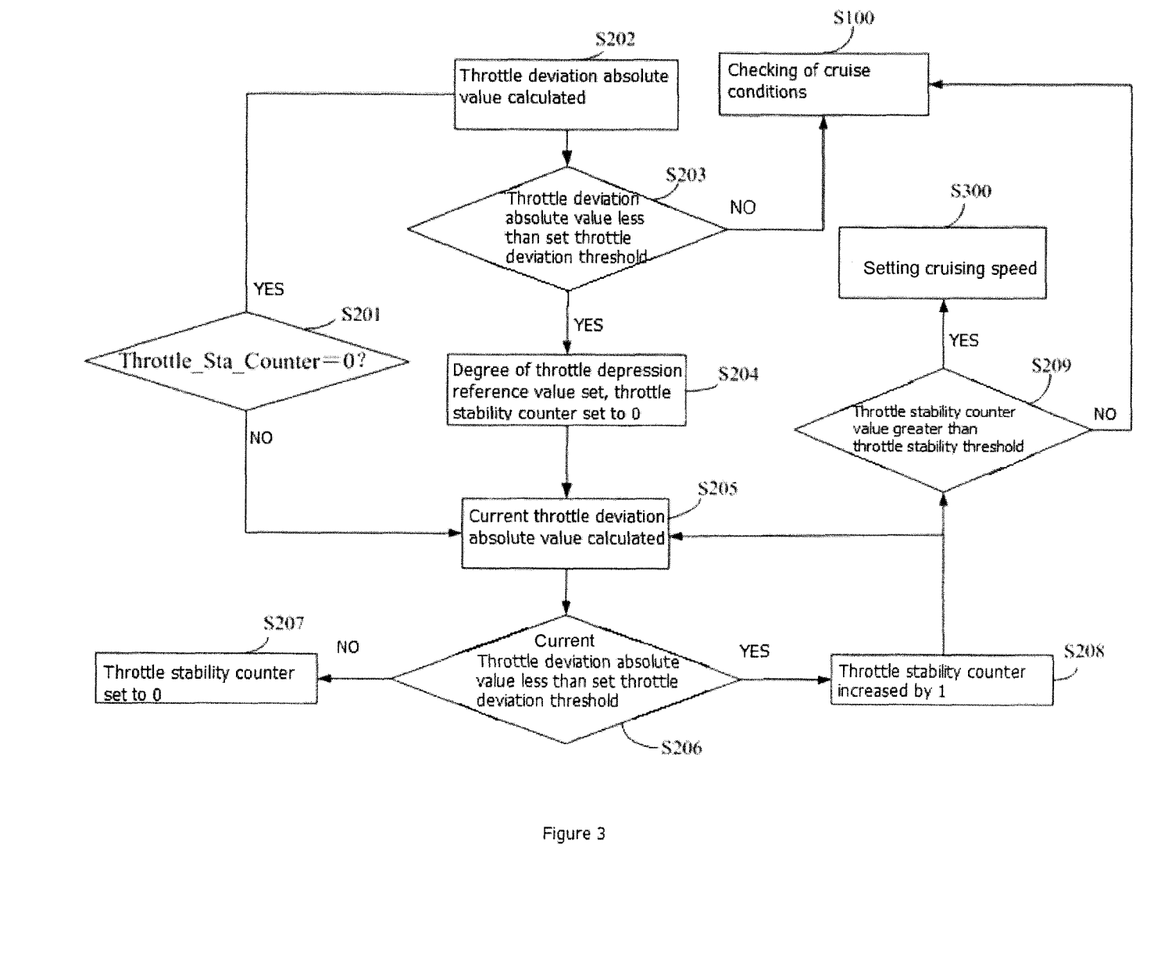
FIG. 3 is a work-flow diagram for the checking of throttle deviation as shown in FIG. 1.
Figure 5:
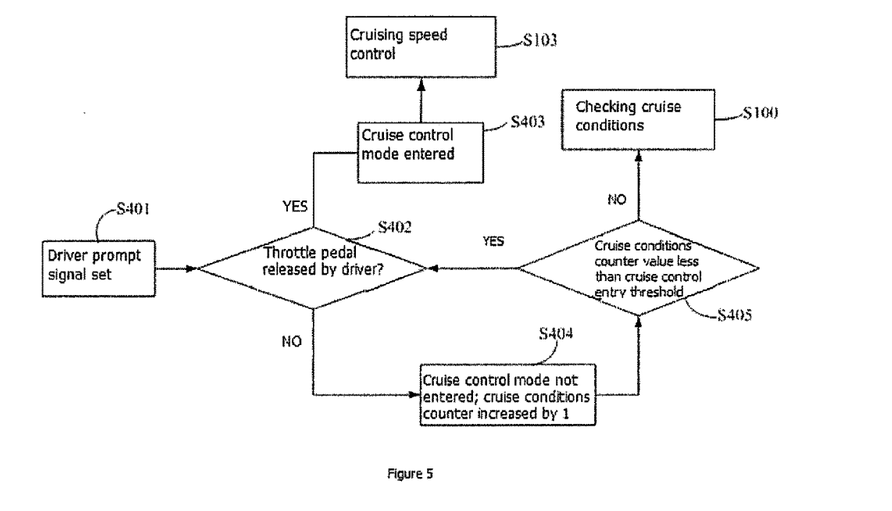
FIG. 5 is a work-flow diagram for the cruise control prompt and checking of drivers' actions as shown in Figure 1.

Step S106: determining as to whether the count value of the cruise conditions counter (CC_entry_counter) is greater than 0, and if so (i.e. CC_entry_counter >0), step S400 for checking the driver's actions as shown in FIG. 5 will be proceeded to; whereby if not, the process of checking throttle deviation, S200 as shown in FIG. 3, will be proceeded to.

Furthermore, with reference to FIG. 3, the process for checking throttle deviation, S200, comprises the following steps:

Step S201: determining whether the throttle stability counter value (Throttle_Sta_Counter) is equal to 0, and if so, proceeding to step S202; while if not, proceeding to step S205.

Step S202: calculating the throttle deviation absolute value (Delta_throttle) by means of the formula Delta_throttle=|Degree of throttle depression (n)−Degree of throttle depression (n−1)|, wherein, Delta_throttle is the throttle deviation absolute value.

Step S203: determining whether the absolute value of throttle deviation (Delta_throttle) is less than the set throttle deviation threshold; and if so, proceeding to step S204; whereby if not, exiting the process and returning to step S100.

Step S204: when the absolute value of throttle deviation (Delta_throttle) is initially determined as being less than the set throttle deviation threshold in step S203, the formula for setting the degree of throttle depression reference value (Throttle_current) is given by Throttle_current=0.5*|Degree of throttle depression (n)+Degree of throttle depression (n−1)|, while at the same time, the throttle stability counter (Throttle_Sta_Counter) is set to 0, and the cycle for counting the throttle stability counter is proceeded to.

The cycle for counting of the throttle stability counter includes the following steps S205, S206 and S208:

Step S205: calculating the current throttle deviation absolute value (Current_Delta_throttle) =|Degree of throttle depression (n) −Throttle_current |.

Step S206: determining whether the current throttle deviation absolute value (Current_Delta_throttle) calculated in step S205 is less than the set throttle deviation threshold (Thro_coun_threshold), and if so, a count of 1 is added to the throttle stability counter (Throttle_Sta_Counter) i.e. step S208, with step S205 then being returned to in order to calculate the current throttle deviation absolute value (Current _Delta throttle) for the next throttle depression sample.

This continues until the throttle stability counter value (Throttle _Sta_counter) is determined as being greater than the set throttle stability threshold (Thro_coun_threshold) in step S209, with the process for checking throttle deviation ending, and the process for setting cruising speed as shown in FIG. 3 (S300) being proceeded to.

Figure 4:
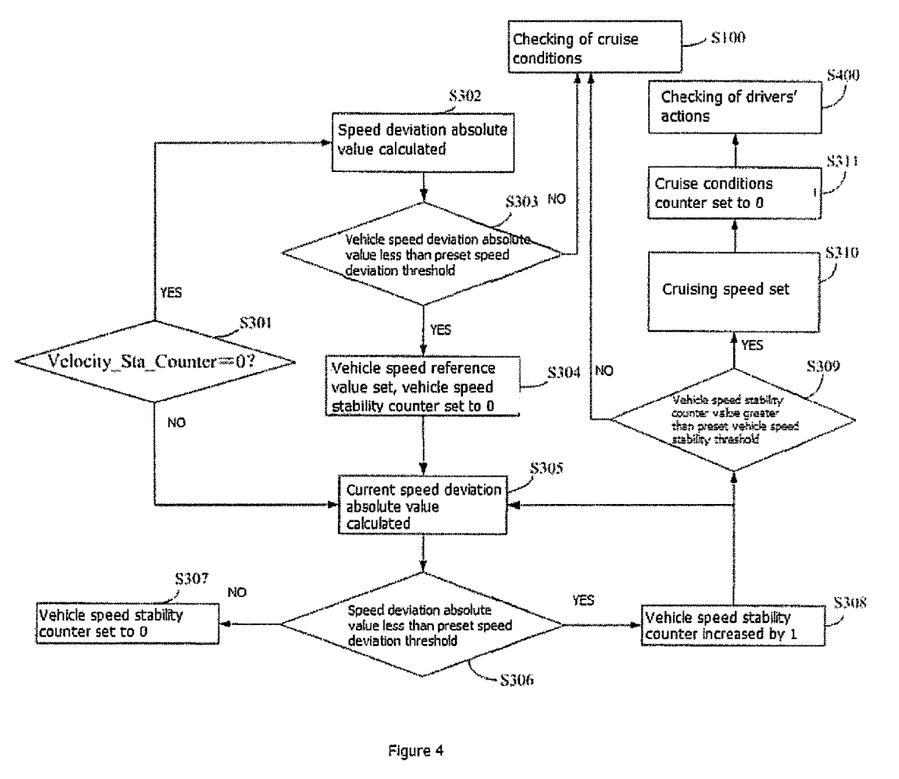
FIG. 4 is a work-flow diagram for the checking of vehicle speed and setting of cruising speed as shown in FIG. 1.

As shown in FIG. 4, the process for checking vehicle speed stability and setting cruising speed in this embodiment (S300) comprises the following steps:

Step S301: determining whether the vehicle speed stability counter value (Velocity_Sta_Counter) is equal to 0, and if so, proceeding to step S302; whereby if not, proceeding to step S305.

Step S302: calculating the absolute value of vehicle speed deviation (DeltaV) by means of the formula DeltaV=|Vehicle speed (n)−Vehicle speed (n−1)|.

Step S303: determining whether the absolute value of vehicle speed deviation (DeltaV) is less than the set vehicle speed deviation threshold; and if so, proceeding to step S304.

Step S304: when the absolute value of vehicle speed (DeltaV) in S303 is initially determined as being less than the set vehicle speed deviation threshold, the speed reference value is set, i.e. Cruise_speed_base=vehicle speed (n), so that the most recently measured vehicle speed (n) (in step S302) is set as the speed reference value. At the same time, the vehicle speed stability counter value (Velocity_Sta_Counter) is set to 0, and the cycle for counting the vehicle speed stability counter is proceeded to.

The cycle for counting of the vehicle speed stability counter includes steps S305, S306 and S308.

Step S305: calculating the absolute value of the current vehicle speed deviation (Current_DeltaV), with the formula Current _DeltaV =|Vehicle speed (n) −Cruise_speed_base |, i.e. the current vehicle speed deviation absolute value is the absolute value given by the difference between each measured vehicle speed (n) and the speed reference value.

Step S306: determining whether the absolute value of vehicle speed deviation (Current_DeltaV) calculated instep S305 is less than the set vehicle speed deviation threshold, and if not, the vehicle speed stability counter is set to 0; whereby if so, i.e. the current vehicle speed deviation absolute value (Current_DeltaV) calculated in step S305 is less than the set vehicle speed deviation threshold, a count of 1 is added to the vehicle speed stability counter value (Velocity_Sta_Counter) (step S308), and step S305 is returned to, with the current vehicle speed deviation absolute value (Current_DeltaV) for the next speed sample being calculated. This continues until the vehicle speed stability counter value (Velocity_Sta_Counter) is determined as being greater than the set vehicle speed stability threshold (Velo_coun_threshold) in step 309, with step S310 then being proceeded to in which cruise conditions are set.

Step S310: the current vehicle speed (n) or a certain set value is set as the cruising speed, while said set value may be the average speed over a certain period of time, or an integer of speed having been rounded up or down, such as 50 km/h, 55 km/h, 60 km/h etc.

Step S311: the count of the cruise conditions counter (CC_entry_counter) is set to 0. At this point, the process for checking vehicle speed deviation is ended, and the process for checking drivers' actions (S400), as shown in FIG. 4, is proceeded to.

With reference to FIG. 5, the process of cruise control prompt and checking of drivers' actions (S400) contains the following steps:

Step S401: setting i.e. issuing the driver cruising prompt message or signal to be perceivable by the driver. The driver cruising prompt message or signal in this step may include a visible prompt message displayed on the dashboard display and/or an audible voice message.

Step S402: checking whether the driver has released the throttle pedal. In this step, it is checked whether the driver has released the throttle pedal, and if so, step S403 is proceeded to, with the vehicle entering cruise control mode; while if not, step S404 is proceeded to.

Step S404: a count of 1 is added to the cruise conditions counter value (CC_entry_counter), and the vehicle does not enter cruise control mode.

Step S405: determining whether the cruise conditions counter value (CC_entry_counter) is less than the set threshold for entering cruise mode (CC_entry_threshold), and if so, returning to step S402, further checking whether the driver has released the throttle pedal; whereby if not, step S100 is returned to, and checking for cruise conditions begins once again.

The aforementioned cruise control method may be realized via the electronic control unit (ECU) of a vehicle.

Figure 6:
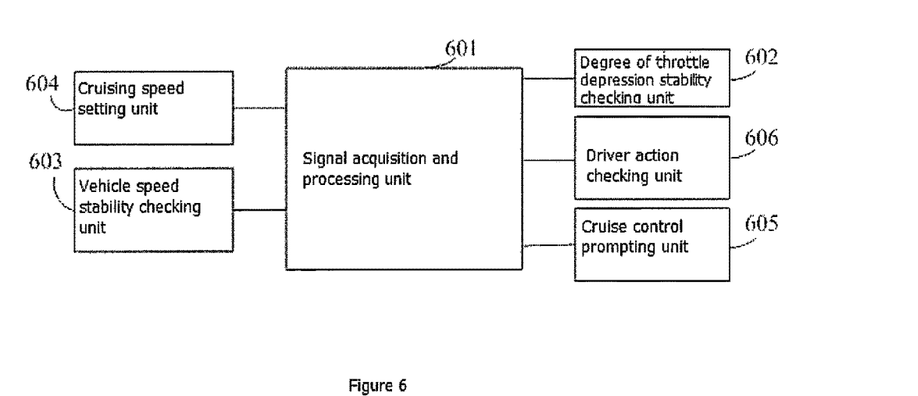
FIG. 6 is a schematic diagram of a cruise control system for performing a cruise control method according to the invention.

As shown in FIG. 6, in another embodiment of the present invention, a cruise control system is also provided, with said cruise control method being used by said cruise control system, which comprises:

A signal acquisition and processing unit 601, which is used to execute the checks for cruising status in step S100 and its sub-steps;

A degree of throttle depression stability checking unit 602, which is used to execute the checks for said throttle deviation in step S200 and its sub-steps;

A vehicle speed stability checking unit 603 and a cruising speed setting unit 604, which are used to execute the checks for cruising speed in step S300 and its sub-steps;

A cruise control prompting unit 605, and a driver action checking unit 606, which are used to execute the checks for drivers' actions in step S400 and its sub-steps.

The degree of throttle depression stability checking unit 602, vehicle speed stability checking unit 603, cruising speed setting unit 604, cruise control prompting unit 605 and driver action checking unit 606 are connected to the signal acquisition and processing unit 601.

The foregoing gives only the preferred embodiments of the present invention and does not pose any limitation to the present invention; to those who are skilled in the art, the present invention may have various alterations and variations. All the modifications, equivalent replacements or improvements in the scope of the present invention shall be included within the scope of protection of the present invention.

What is claimed is:

1. A method for cruise control of a vehicle, comprising:
   determining whether the vehicle is in a cruise control mode; and
   when the vehicle is in the cruise control mode, maintaining the vehicle in the cruise control mode until an exit signal is detected;
   when the vehicle is not in the cruise control mode, checking for cruise conditions, which comprises detecting a throttle pedal position signal that indicates a position of a throttle pedal of the vehicle and a vehicle speed signal that indicates a vehicle speed of the vehicle, checking a throttle deviation in the throttle pedal position signal to determine a throttle stability as a first cruise condition, checking a stability of the vehicle speed of the vehicle in the vehicle speed signal as a second cruise condition, and setting a cruising speed; when both the first and second cruise conditions have been met, issuing a cruising prompt message to be perceivable by a driver of the vehicle and detecting actions of the driver including detecting whether the driver has released the throttle pedal of the vehicle after the cruising prompt message has been issued; and
   in response to detecting that the driver has released the throttle pedal after the cruising prompt message has been issued, automatically entering the vehicle into the cruise control mode, and in the cruise control mode automatically controlling the vehicle speed of the vehicle to the cruising speed that was set.

2. The method according to claim 1, further comprising:
   during the maintaining of the vehicle in the cruise control mode, detecting whether there is an exit signal, and when the exit signal is detected, then exiting the vehicle from the cruise control mode, and again beginning the checking for the cruise conditions; when the exit signal is not detected, then further maintaining the cruise control mode;
   when the vehicle is not in the cruise control mode, determining whether a count value of a cruise conditions counter is greater than 0, and if so, proceeding to the detecting of the actions of the driver, and if not, proceeding to the checking of the throttle deviation.

3. The method according to claim 2, characterized in that said exit signal includes at least one signal selected from a group consisting of a brake signal, a signal for degree of throttle depression, a steering wheel signal, a gear signal and a clutch signal.

4. The method according to claim 2, characterized in that the checking of the throttle deviation comprises the following sub-steps:
   determining whether a value of a throttle stability counter is equal to 0, and if not, proceeding to counting of the throttle stability counter;
   if the value of the throttle stability counter is equal to 0, calculating an absolute value of throttle deviation which is an absolute value given by a difference between two successive sample values of the position of the throttle pedal indicated in the throttle pedal position signal;
   determining whether the absolute value of throttle deviation is less than a set throttle deviation threshold;
   if the absolute value of throttle deviation is less than the set throttle deviation threshold, setting a throttle depression reference value, and setting the value of the throttle stability counter to 0, and proceeding to the counting of the throttle stability counter;
   determining whether the value of the throttle stability counter is greater than a set throttle stability threshold, whereby if the value of the throttle stability counter is greater than the set throttle stability threshold, proceeding to the checking of the stability of the vehicle speed and the setting of the cruising speed.

5. The method according to claim 4, characterized in that the counting of the throttle stability counter comprises the following sub-steps:
   calculating a current throttle deviation absolute value given by a difference between a current value of the position of the throttle pedal indicated in the throttle pedal position signal and the throttle depression reference value; and
   determining whether the current throttle deviation absolute value is less than the set throttle deviation threshold, and if so, adding a count of 1 to the value of the throttle stability counter, then returning to the calculating of the current throttle deviation absolute value and entering a next cycle until the value of the throttle stability counter is greater than the set throttle stability threshold, and then proceeding the checking of the stability of the vehicle speed and the setting of the cruising speed, and if the value of the throttle stability counter is not greater than the set throttle stability threshold then exiting the checking of the throttle deviation and again proceeding to the checking for the cruise conditions.

6. The method according to claim 4, characterized in that the checking of the stability of the vehicle speed and the setting of the cruising speed comprise the following sub-steps:
   determining whether a value of a vehicle speed stability counter is equal to 0, and if not, counting the vehicle speed stability counter;
   if the value of the vehicle speed stability counter is equal to 0, calculating an absolute value of vehicle speed deviation given by a difference between two successive sample values of the vehicle speed indicated in the vehicle speed signal;
   determining whether the absolute value of vehicle speed deviation is less than a set vehicle speed deviation threshold;
   if the absolute value of vehicle speed deviation is less than the set vehicle speed deviation threshold, setting a vehicle speed reference value, setting the value of the vehicle speed stability counter to 0, and proceeding to counting of the vehicle speed stability counter.

7. The method according to claim 6, characterized in that the counting of the vehicle speed stability counter comprises the following sub-steps:
   calculating an absolute value of a current vehicle speed deviation given by a difference between a current value of the vehicle speed and the vehicle speed reference value;
   determining whether said absolute value of the current vehicle speed deviation is less than the set vehicle speed deviation threshold, whereby if not, then setting the value of the vehicle speed stability counter to 0 and exiting the cruise control mode, and carrying out the checking for the cruise conditions once again, and whereby if so, then adding a count of 1 to the value of the vehicle speed stability counter, and returning to the calculating of the absolute value of the current vehicle speed deviation; and repeating the above sub-steps until the value of the vehicle speed stability counter is greater than a set vehicle speed stability threshold, and then proceeding to the setting of the cruising speed.

8. The method according to claim 7, characterized in that the setting of the cruising speed comprises the following sub-steps:

setting the cruising speed; and setting the count value of the cruise conditions counter to 0.

9. The method according to claim 1, further comprising, after the detecting of whether the driver has released the throttle pedal of the vehicle: if the driver has not released the throttle pedal, then adding 1 to a value of a cruise conditions counter, and not entering the vehicle into the cruise control mode;

determining whether the value of the cruise conditions counter is less than a set threshold for entering the cruise control mode, and if so, returning to the detecting of whether the driver has released the throttle pedal, and if not, returning to the checking for the cruise conditions.

10. The method according to claim 1, characterized in that said cruising prompt message for the driver includes a visible display message shown on a dashboard display of the vehicle and/or an audible voice message.

11. The method according to claim 1, characterized in that during said step of checking the throttle deviation, a deviation in a degree of throttle pedal depression between two control cycles within a certain period of time is less than a set throttle deviation threshold; during said step of setting the cruising speed, if the vehicle speed deviation is less than the set vehicle speed deviation threshold, then a count of 1 is added to the value of the vehicle speed stability counter, and if the value of the vehicle speed stability counter exceeds the set vehicle speed stability threshold, a request will be made for the cruising speed to be set; during said step of detecting actions of the driver, once the cruise conditions have been met, the cruising prompt message is issued, and after the cruising prompt message has been issued and it is detected that the driver has released the throttle pedal, the vehicle is automatically entered into the cruise control mode; and when an exit signal is detected, the cruise control mode is exited.

12. The method according to claim 2, further comprising, after the detecting of whether the driver has released the throttle pedal of the vehicle:

if the driver has not released the throttle pedal, then adding 1 to the count value of the cruise conditions counter, and not entering the vehicle into the cruise control mode;

determining whether the count value of the cruise conditions counter is less than a set threshold for entering the cruise control mode, and if so, returning to the detecting of whether the driver has released the throttle pedal, and if not, returning to the checking for the cruise conditions.

13. The method according to claim 7, further comprising, after the detecting of whether the driver has released the throttle pedal of the vehicle:

if the driver has not released the throttle pedal, then adding 1 to the count value of the cruise conditions counter, and not entering the vehicle into the cruise control mode;

determining whether the count value of the cruise conditions counter is less than a set threshold for entering the cruise control mode, and if so, returning to the detecting of whether the driver has released the throttle pedal, and if not, returning to the checking for the cruise conditions.

14. A cruise control system for a vehicle, comprising a signal acquisition and processing unit, as well as a degree of throttle depression stability checking unit, a vehicle speed stability checking unit, a cruising speed setting unit, a cruise control prompting unit a driver action checking unit and a cruise control, which are connected to said signal acquisition and processing unit, wherein said system is configured and arranged so that:

a) the degree of throttle depression stability checking unit determines a change of a throttle pedal position of a throttle pedal of the vehicle over time, b) the vehicle speed stability checking unit determines a change of a driving speed of the vehicle over time, c) when the change of the throttle pedal position is less than a throttle deviation threshold during a time period greater than a throttle stability threshold, and the change of the driving speed is less than a speed deviation threshold during a time period greater than a speed stability threshold, then the cruising speed setting unit sets a cruising speed value and the cruise control prompting unit outputs a cruising prompt message to be perceivable by a driver of the vehicle, d) the driver action checking unit detects whether the throttle pedal has been released by the driver, after the cruise control prompting unit has output the cruising prompt message; and e) when the driver action checking unit detects that the throttle pedal has been released by the driver after the cruise control prompting unit has output the cruising prompt message, then the cruise control is automatically activated to automatically control the driving speed of the vehicle to the cruising speed value.

15. A method of automatically activating a cruise control of a vehicle, comprising the following steps performed by an electronic control unit of the vehicle:

a) determining a change of a throttle pedal position of a throttle pedal of the vehicle over time;

b) determining a change of a driving speed of the vehicle over time;

c) when the change of the throttle pedal position is less than a throttle deviation threshold during a time period greater than a throttle stability threshold, and the change of the driving speed is less than a speed deviation threshold during a time period greater than a speed stability threshold, then setting a cruising speed value and outputting a cruising prompt message to be perceivable by a driver of the vehicle;

d) after the outputting of the cruising prompt message, detecting whether the throttle pedal has been released by the driver; and e) when it is detected in the step d) that the throttle pedal has been released by the driver after the outputting of the cruising prompt message, then automatically activating a cruise control of the vehicle to automatically control the driving speed of the vehicle to the cruising speed value.

16. A cruise control method for a vehicle, comprising the following steps performed in successive cycles:
   a) detecting a throttle pedal position of a throttle pedal of the vehicle;
   b) determining a throttle deviation value as a difference between the throttle pedal position detected in a current cycle of the successive cycles and the throttle pedal position detected in a prior cycle of the successive cycles;
   c) comparing the throttle deviation value determined in the current cycle to a prespecified throttle deviation threshold;
   d) detecting a vehicle speed of the vehicle;
   e) determining a vehicle speed deviation value as a difference between the vehicle speed detected in the current cycle and the vehicle speed detected in the prior cycle;
   f) comparing the vehicle speed deviation value determined in the current cycle to a prespecified speed deviation threshold;
   g) when the comparing in the step c) determines that the throttle deviation value determined in the current cycle is less than the prespecified throttle deviation threshold, and the comparing in the step f) determines that the vehicle speed deviation value determined in the current cycle is less than the prespecified speed deviation threshold, then incrementing a vehicle speed stability counter value;
   h) comparing the vehicle speed stability counter value resulting after the step g) in the current cycle to a prespecified vehicle speed stability threshold;
   i) when the comparing in the step h) determines that the vehicle speed stability counter value resulting after the step g) in the current cycle exceeds the prespecified vehicle speed stability threshold, then setting a cruising speed value and outputting a cruising prompt message to be perceivable by a driver of the vehicle;
   j) after the outputting of the cruising prompt message, detecting whether the throttle pedal has been released by the driver; and
   k) when it is detected in the step j) that the throttle pedal has been released by the driver after the outputting of the cruising prompt message, then automatically activating a cruise control of the vehicle to automatically control the vehicle speed to the cruising speed value.

* * * * *

UNITED STATES PATENT AND TRADEMARK OFFICE
CERTIFICATE OF CORRECTION

PATENT NO. : 10,166,983 B2  
APPLICATION NO. : 15/360435  
DATED : January 1, 2019  
INVENTOR(S) : Liu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this  
Tenth Day of December, 2019

Andrei Iancu  
*Director of the United States Patent and Trademark Office*